US010445356B1

(12) United States Patent
Mugan et al.

(10) Patent No.: US 10,445,356 B1
(45) Date of Patent: Oct. 15, 2019

(54) METHOD AND SYSTEM FOR ANALYZING ENTITIES

(71) Applicant: PULSELIGHT HOLDINGS, INC., Austin, TX (US)

(72) Inventors: Jonathan William Mugan, Buda, TX (US); Laura Hitt, Austin, TX (US); Jimmie Goode, Austin, TX (US); Russ Gregory, Austin, TX (US); Yuan Qu, Austin, TX (US)

(73) Assignee: Pulselight Holdings, Inc., Austin, TX (US)

( * ) Notice: Subject to any disclaimer, the term of this patent is extended or adjusted under 35 U.S.C. 154(b) by 168 days.

(21) Appl. No.: 15/632,180

(22) Filed: Jun. 23, 2017

Related U.S. Application Data

(60) Provisional application No. 62/354,612, filed on Jun. 24, 2016.

(51) Int. Cl.
*G06F 17/27* (2006.01)
*G06F 16/34* (2019.01)
*G06N 3/08* (2006.01)
*G06F 17/28* (2006.01)
*G06F 16/33* (2019.01)

(52) U.S. Cl.
CPC .......... *G06F 16/345* (2019.01); *G06F 16/334* (2019.01); *G06F 17/2785* (2013.01); *G06F 17/289* (2013.01); *G06N 3/08* (2013.01)

(58) Field of Classification Search
CPC ...... G06F 17/27; G06F 17/20; G06F 17/2705; G06F 17/271; G06F 17/2715; G06F 17/272; G06F 17/2725; G06F 17/273; G06F 17/2735; G06F 17/274; G06F 17/2745; G06F 17/275; G06F 17/2755; G06F 17/276; G06F 17/2765; G06F 17/277; G06F 17/2795
USPC ............................................................ 704/9
See application file for complete search history.

(56) References Cited

U.S. PATENT DOCUMENTS

| | | | | |
|---|---|---|---|---|
| 5,619,709 A * | 4/1997 | Caid | ....................... | G06F 16/58 715/209 |
| 7,702,507 B2 * | 4/2010 | Tilley | .................. | H04L 63/0861 704/256 |
| 8,108,398 B2 * | 1/2012 | Guday | .................. | G06F 16/345 707/739 |
| 8,488,916 B2 * | 7/2013 | Terman | .................... | G09B 5/08 382/187 |
| 8,914,395 B2 * | 12/2014 | Jiang | .................. | G06F 16/3337 707/760 |
| 2002/0120435 A1 * | 8/2002 | Frazier | .................. | G06N 3/105 704/1 |
| 2002/0188841 A1 * | 12/2002 | Jones | .................. | G06K 7/1417 713/153 |

(Continued)

*Primary Examiner* — Lamont M Spooner
(74) *Attorney, Agent, or Firm* — J. Roger Williams, Jr.

(57) ABSTRACT

A recurrent neural network (RNN) method implemented on a computer system is used to produce summaries of unstructured text generated by multiple networks of individuals interacting over time by encoding the unstructured text into intermediate representations and decoding the intermediate representations into summaries of each network. Parameter data for the RNN is obtained by using multiple different versions of the same source texts to train the computer system. The method and computer system can be used to identify which of the networks match a query by determining which network generates the query with low or lowest cost.

15 Claims, 7 Drawing Sheets

(56) References Cited

U.S. PATENT DOCUMENTS

| | | | |
|---|---|---|---|
| 2004/0148170 A1* | 7/2004 | Acero | G06F 17/2715 704/257 |
| 2005/0038658 A1* | 2/2005 | Sladden | H04L 41/0266 704/270.1 |
| 2006/0173672 A1* | 8/2006 | Bergeron | G06F 17/27 704/9 |
| 2008/0126076 A1* | 5/2008 | Ming | G06F 17/2827 704/4 |
| 2008/0290987 A1* | 11/2008 | Li | G06Q 30/02 340/5.1 |
| 2009/0006085 A1* | 1/2009 | Horvitz | G10L 17/26 704/223 |
| 2009/0024595 A1* | 1/2009 | Chen | G06F 16/951 |
| 2010/0185447 A1* | 7/2010 | Krumel | G10L 15/32 704/255 |
| 2012/0166180 A1* | 6/2012 | Au | G06F 17/274 704/9 |
| 2013/0138436 A1* | 5/2013 | Yu | G06N 3/08 704/232 |
| 2014/0244261 A1* | 8/2014 | Arisoy | G10L 15/18 704/257 |
| 2015/0019214 A1* | 1/2015 | Wang | G10L 15/34 704/232 |
| 2015/0095026 A1* | 4/2015 | Bisani | G10L 15/08 704/232 |
| 2015/0348538 A1* | 12/2015 | Donaldson | G10L 15/08 704/235 |
| 2016/0063993 A1* | 3/2016 | Dolan | G06F 16/00 704/254 |
| 2016/0110343 A1* | 4/2016 | Kumar Rangarajan Sridhar | G06F 17/2715 704/9 |
| 2016/0254009 A1* | 9/2016 | Fine | G10L 17/22 704/250 |
| 2018/0025726 A1* | 1/2018 | Gatti de Bayser | G10L 15/22 704/257 |

\* cited by examiner

METHOD AND SYSTEM FOR ANALYZING ENTITIES

The present application claims the priority of U.S. Provisional Application No. 62/354,612, filed Jun. 24, 2016, which is hereby incorporated in its entirety.

Embodiments of the invention were made with government support under contract numbers N00014-13-C-0171 and N00014-08-C-0257 awarded by the Office of Naval Research. The government has certain rights in the invention.

FIELD OF THE INVENTION

The field of the invention is artificial intelligence, more specifically, machine learning and data mining, and even more specifically, applications of artificial neural networks and deep learning methods for natural language processing.

BACKGROUND

Previous research suggests methods for discovering networks of individuals consistently interacting over time through temporal analysis and event response monitoring ("TAERM Network Detection Methods"). See J. Mugan, E. McDermid, A. McGrew, and L. Hitt, Identifying Groups of Interest Through Temporal Analysis and Event Response Monitoring, In *IEEE Conference on Intelligence and Security Informatics* (*ISI*), 2013. Such methods may reveal many such networks for a given domain, however. Depending on the domain and the amount of data, the number of networks discovered may be so large that it is difficult for the analyst to identify which networks, among the potentially large number of networks discovered, warrant further investigation.

Another area of research focuses on methods for using unstructured text to characterize entities. Extractive summarization is the problem of representing a document by its most important sentences. One method of extractive summarization works by finding the k most frequent words in the document (ignoring stop words). Those words are assumed to describe the document and are called important. One can then score each sentence based on how many important words occur in the document (one can normalize by how many words are in the sentence, or one can give a higher score if important words occur together). The n most important sentences become the summary. More broadly, extractive summarization chooses a subset of the document as the summarization. If a document has 30 sentences, an extractive summarization method may try to find, say, the top 2 that best represent the document.

A modern version of the extractive text summarization approach is to use Latent Semantic Analysis (LSA). To extract summaries using LSA one creates a matrix A that is a term-sentence matrix of size m×n where m is the number of terms and n is the number of sentences. One then performs singular value decomposition on A so that $A=T\Sigma S^T$. Matrix $\Sigma$ is diagonal and has the r singular values and is of size [r×r]. We can think of the r values of $\Sigma$ as being the r most important concepts in the document, ordered by importance. Matrix T is the term matrix and row j of T corresponds to term j of A. The first value of row j of T gives a score of how relevant the most important concept is to term j. Likewise, column i of $S^T$ corresponds to sentence i, and index 0 of that column is a score of how relevant the most important concept is to sentence i. Index 1 of that column is a score of how relevant the second most important concept is to sentence i, and so on, up to r. This means that one can take the sentence s E S with the singular vector whose first value is highest as the most important sentence, as was done in Yihong Gong and Xin Liu, Generic text summarization using relevance measure and latent semantic analysis, In *Proceedings of the 24th annual international ACM SIGIR conference on Research and development in information retrieval*, pages 19-25. ACM, 2001.

A variation of Latent Semantic Analysis was proposed in Josef Steinberger and Karel Jezek, Using latent semantic analysis in text summarization and summary evaluation, In Proc. ISIM'04, pages 93-100, 2004 ("Steinberger-Jezek LSA"). The variation takes the most important sentence as the sentence whose column vector in $S^T$ has the highest magnitude when weighted by the singular values in $\Sigma$.

Extractive summarization methods may have utility in the special case of documents that contain a summary of the content of the document in a small number of sentences. Extractive summarization is inadequate, however, in cases where the document lacks a summary or a sentence or small number of sentences that alone adequately summarizes the document.

Abstractive summarization is an alternative to extractive summarization. Ganesan, et al. (Kavita Ganesan, ChengXiang Zhai, and Jiawei Han. Opinosis: a graph-based approach to abstractive summarization of highly redundant opinions, In *Proceedings of the 23rd international conference on computational linguistics*, pages 340-348. Association for Computational Linguistics, 2010, http://kavita-ganesan-.com/opinosis) discloses a symbolic abstractive method which works by taking all of the words in the document to be summarized and making a graph. This method makes a node for each combination of word and part of speech, and they connect two nodes with an edge if the associated words follow each other in the document. Once they have built this graph, they find heavily traveled paths, and those become the summaries. This method is designed for situations where there is high redundancy. In fact, it is not really to summarize a "document" but rather to summarize a large number of reviews for a product. Because this method uses words as symbols to define nodes, it is a symbolic method, and so it requires a high density of text around relatively few topics because the text must say the same thing using the same words multiple times. Consequently, graph-based abstractive summarization and other symbolic methods may not perform well at characterizing entities based on sparse environments. In addition, symbolic methods are not able to generalize, which makes them less amenable to supervised training.

Other embodiments of approaches to abstractive summarization are disclosed in Ramesh Nallapati, Bowen Zhou, Cicero dos Santos, Caglar Gulcehre, Bing Xiang, Abstractive Summarization using Sequence-to-sequence RNNs and Beyond, *arXiv preprint arXiv:*1602.06023v3, 23 Apr. 2016 and in Baotian Hu, Qingcai Chen, Fangze Zhu, LCSTS: A Large Scale Chinese Short Text Summarization Dataset, In *Proceedings of the* 2015 *Conference on Empircal Methods in Natural Language Processing*, pages 1967-1972, Lisbon, Portual, 17-21 Sep. 2015, Association for Computational Linguistics. The tools described in these approaches, however, are trained and tested on source datasets limited to news articles or short news and information pieces. News articles conventionally use an "inverted pyramid" format, in which the lead sentence describes the focus of the article and the most important facts are presented in the opening paragraph. Whether dictated by convention or authorial intent, the information required to accurately summarize a news article will be included in the opening sentences of the source. Sentences at the end of the article are likely to contribute very little information to a helpful summary of the article. The short news and information pieces (Weibo) described in Hu are focused and fact-dense because of the text length limitation of 140 characters. Also, such newspaper articles and short news and information pieces typically reflect a consistent viewpoint, thus providing an inherent focus to the exposition.

Such concise, focused, orderly and well-behaved source materials are significantly different in terms of organization and structure from the interaction data generated by entities such as networks of individuals that interact over time. A corpus of such interaction data (for example, a collection of tweets broadcast by Twitter®) may aggregate multiple utterances by multiple speakers speaking at different times. Because the interaction data may include utterances by multiple speakers, the utterances may reflect different, and possibly even conflicting or inconsistent viewpoints, and there is no journalist or editor to enforce the "inverted pyramid" format or to provide a concise summary of the topic of discussion. Because the interaction data may include statements, messages, or other utterances over a period of time, significant facts may be in the last utterances, as opposed to the first ones, or randomly distributed throughout the corpus. Known abstractive summarization techniques are neither trained nor tested to handle the disorganized and entropic content characteristic of interaction data generated by a network of individuals interacting over time.

SUMMARY

Disclosed is a method of investigating a computer network comprising a recurrent neural network (RNN) method implemented on an Object Translator computer system. The Object Translator computer system includes computer instructions to produce summaries of interaction data comprising unstructured text generated by multiple networks of individuals interacting over time by encoding the interaction data into intermediate representations and decoding the intermediate representations into summaries of each network.

Also disclosed is a computer system comprising one or more processors, non-transitory storage media, and computer instructions stored on the storage media operative to cause the computer system to produce summaries of interaction data comprising unstructured text generated by multiple networks of individuals interacting over time by encoding the interaction data into intermediate representations and decoding the intermediate representations into summaries of each network.

In embodiments of the method and computer system, parameter data for the RNN is obtained by using multiple different versions of the same source texts to train the computer system. In other embodiments of the method and computer system, a query can be used to investigate the networks by identifying which network generates the query with low or lowest cost.

DETAILED DESCRIPTION

Figure 1:
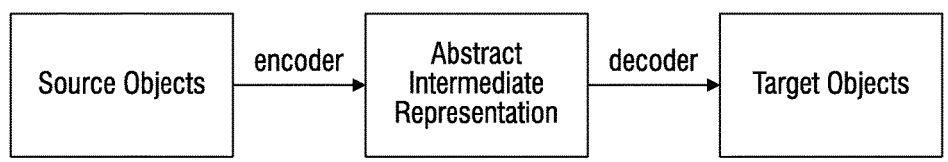
FIG. 1 is a block diagram of an object translator.

Embodiments described here provide exemplary methods of characterizing networks or other entities from unstructured text. With the ability to characterize entities it is possible to generate natural language descriptions for entities. Among other benefits, the exemplary methods disclosed here for characterizing entities allow an analyst to more easily identify which networks or other entities warrant further investigation. In addition, embodiments described herein also provide tools to query entities using natural language queries.

Embodiments described here build upon transformative recent advances in deep learning applied to natural language processing. Previous work in natural language processing represented meaning using symbols. Symbol-based methods include keywords and frames, and such methods have significant disadvantages because two words can only be equal or not equal, and therefore the symbols do not themselves encode meaning. Symbol-based methods are time consuming because humans must manually make associations, for example by stating that a "car" is the same thing as an "automobile", or that a "car" and a "truck" are both "vehicles." Systems built upon manually making associations are brittle because associations that are not manually made are not known to the machine. In addition, when humans do take the time to make associations in one domain, those associations do not transfer to other domains.

The advantages of deep learning methods come from the fact that meanings are represented using vectors instead of symbols, and these vectors are learned by the machine. For example, the vector for "car" can be similar to the vector for "truck," and both vectors can be quite different from the vector for "taco." Systems based on deep learning are therefore cost efficient because humans do little manual work, and they are flexible because the systems learn gradations of association, which allow them to handle unforeseen queries and attributes. Such systems are also domain general because moving to a new domain only requires obtaining training data associated with that domain.

Deep learning has multiple advantages over other machine learning methods, such as support vector machines (SVMs). Deep learning helps one overcome the curse of dimensionality. The curse of dimensionality arises because as the dimensions of a space are increased, an exponential number of training examples are needed to represent it. Template-based methods such as SVMs suffer from the curse of dimensionality because they rely on a "smoothness prior" that assumes that the local state around the template will have the same class as the template. Such template-based methods can be called "fence and fill" because they divide the space such that each point takes the label of its closest template.

By contrast, instead of relying on a "smoothness prior," deep learning assumes that the world decomposes into features usable to identify many objects, and that these features compose into a hierarchy. Using these assumptions, deep learning overcomes the curse of dimensionality by learning causal independent factors that make up the objects in the space. For example, consider the problem of identifying ships in images. A ship consists of multiple features, and it is not feasible to learn a template for every possible kind of ship at every possible angle. The goal is to learn the underlying features that make up ships so that they can be brought to bear on identifying ships.

This type of feature-based representation is sometimes called a distributed representation. Distributed representations can express an exponential number of concepts by composing the activations of many features. In a distributed representation, the input pattern represented by features that are not mutually exclusive. Distributed representations are sub-symbolic. Each concept, corresponding to a symbol, is a combination of sub-symbolic features. Instead of representing the dots (centroids, templates, examples) in fence and fill, distributed representations encode hyperplanes.

Deep learning can also be more efficient than other methods because computations (such as a feature being detected) can be used many times in above layers. This efficiency is augmented by the fact that deep learning can use unlabeled data. In an unsupervised setting, deep learning can learn hyperplanes that represent the causes of variation in the input data. This means that deep learning may need less labeled data to label the regions of the area generated by these causes represented as hyperplanes.

An embodiment of a method for characterizing entities using unstructured text uses embodiments of deep learning methods, and may be called Object Translator or "Translator" for short. The Translator learns to convert source objects to target objects. FIG. 1 shows a block diagram overview of an exemplary Translator 100.

The exemplary Object Translator comprises an encoder that converts source objects to an abstract intermediate representation, and a decoder that converts the abstract intermediate representation into target objects. The encoder and decoder are both learned using a large amount of training data consisting of pairs of source and target objects. Both the source and target objects can be sequences, such as sequences of words. The encoder preferably learns to abstract similar source objects to nearby locations in the intermediate space. Similarly, the decoder preferably learns to generate similar target objects for nearby objects in the intermediate space. Finally, the encoder and decoder preferably learn to be aligned so that the mapping of source objects to target objects accords with the training data. In an embodiment, the intermediate representation may be, or may include, a numeric representation in a high-dimensional space, for example, a vector. A vector representation is useful because target objects that are sequences are generated from a decoder that is implemented as a recurrent neural network, which can take the intermediate vector as its first context, or initial context state.

Target objects can be short descriptions of entities that were encoded as source objects. Embodiments of this architecture enable querying of source objects from target objects. An embodiment defines the query as a target object and computes the cost of translating each source object to the target object. The "query" is the source object with the lowest cost. Alternatively, the "query" may be the source object with a cost that is "low" compared to a predetermined cost threshold.

An entity, in an embodiment, may be a network of individuals that interact over time so as to generate interaction data comprising unstructured text. An entity also may include an individual that interacts with others over time and generates interaction data comprising unstructured text. A collection of interaction data for an entity may include, in an embodiment, a quantity of text or other data generated by the entity's interactions with others. Interaction data may include unstructured text in a variety of utterances in different media, including but not limited to texts, tweets, emails, phone calls, recorded conversations, or any other source of text.

Consider, for example, a set of tweets coming from a particular country. Network detection can be used to identify groups of individuals consistently interacting over time. The corpus of text associated with the tweets of the members of a particular network can be the source object associated with that network. If training data is available that allows text to be mapped to short descriptions, such as a large number of news articles with the associated headlines, these collections of source objects can be encoded into a short description for each network. Unlike extractive summarization methods, embodiments described herein seek to create a description of the source text using a novel combination of words. Arbitrary queries can be used to return networks by noting the cost of translating the text associated with each network to the query.

Embodiments of the Object Translator comprise recurrent neural networks (RNNs). RNNs can encode sequences of vectors into a single vector representing its meaning and can decode vectors back into individual words. An RNN can be considered as a more sophisticated version of a Hidden Markov Model (HMM). RNNs take advantage of a distributed representation to store a large amount of information in their states.

Figure 2:
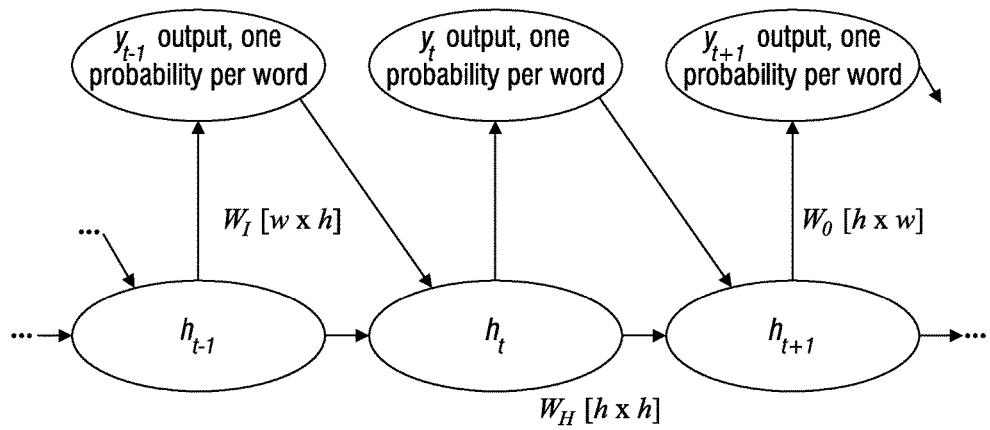
FIG. 2 illustrates features of a basic recurrent neural network (RNN).

FIG. 2 illustrates an exemplary basic RNN 200 for predicting the probability distribution over the next word in a sentence. The state of the network at time t (word place location t) is stored in a vector $h_t$. The matrices $W_I$, $W_H$, and $W_O$ store the parameters of the model that are learned, in an embodiment, through backpropagation. The number of hidden units is given by h, and the number of words in the vocabulary is given by w. The word at time t−1 can be represented as a one-hot vector $y_{t-1}$ (one-hot means all of the values are 0 except for the index corresponding to the word, which is 1), and the probability distribution computed at time t for the output word at time t is given by $\hat{y}_t$.

In an exemplary basic RNN, the value of $h_t$ can be calculated as:

$$h_t = \tan h(y_{t-1}^T W_I + h_{t-1}^T W_H)$$

The probability distribution $\hat{y}_t$ over the next word can be calculated as $$\hat{y}_t = \sigma(h_t^T W_O)$$

where σ is the softmax function and the superscript T denotes transpose.

A basic recurrent neural network, such as exemplary RNN 200 shown in FIG. 2, may not be able to hold information for long periods. Deep learning consists of learning the parameters of a model M that optimizes an objective function (or cost function). What makes this kind of learning "deep" is that the model M consists of a topological ordering of nonlinear functions where the outputs of functions serve as the inputs to the functions directly higher in the ordering. These functions are differentiable, which supports optimizing the parameters for model M using backpropagation, a computational graph, and other techniques based on differentiable functions. A computation graph is a directed graph data structure that uses nodes and directed edges to express the ordering and other relationship between symbolic components of a function. An embodiment of backpropagation updates the parameter values based on the derivative of the error with respect to those values, and since the parameters are ordered by the computational graph, they can be updated using the chain rule. Embodiments of backpropagation methods calculate the gradient of a loss function with respect to all the weights in the network. The gradient is fed to the optimization method which in turn uses it to update the weights, in an attempt to minimize the cost function (or loss function).

An Exemplary Object Translator.

The following paragraphs describe an exemplary embodiment of an Object Translator as an embodiment of a nonlinear parametric model. To provide a concrete exemplary embodiment, we first describe nonlinear parametric models, then we describe how they can have multiple layers, and finally we describe how multiple layers can be formed into an exemplary embodiment of the Object Translator.

Nonlinear Parametric Models.

Consider a set of training examples (X, Y) where each element of $(x_i, y_i) \in (X, Y)$ consists of an instance where $x_i$ is the features and $y_i$ is what we want to predict. Assume that there are n training instances in (X, Y). We want to learn a function of the form $$y = f(x)$$

The function $f$ that we will learn is a nonlinear parametric function. One simple such function could be $$y = f(x) = \sigma(wx+b) = \sigma(g(x))$$

Where $g(x) = wx+b$, w is a vector of parameters, b is a single parameter, and $\sigma$ is a nonlinear function, for example, a sigmoid. To learn function $f$, we need to learn values for the parameters w and b, and an embodiment does this by searching for a set of values for those parameters that allow function $f$ to best approximate the training data (X, Y).

We will use an embodiment of an error function E(w, b) that measures how well the values for parameters w and b allow function $f$ to approximate the training data (X, Y).

$$E(w, b) = \frac{1}{2}\sum_{i=1}^{n}(y_i - f(x_i))^2 = \frac{1}{2}\sum_{i=1}^{n}(y_i - \sigma(wx+b))^2$$

We set the parameters to initial values, such as random values from a Gaussian distribution, or zeros; and we iteratively update the parameters to lower the value of the error function using gradient descent. Gradient descent is an iterative method where we set the values of the parameters, compute gradient $\nabla E(w, b)$ of the error function E(w, b) at those parameter values, and use the gradient to update the parameter values. The gradient may be computed automatically using Theano or other commercially-available software libraries, and the steps involved in computing a gradient are within the knowledge of the person of ordinary skill in the art. The following discussion describes an exemplary method of computing the gradient in an embodiment.

The gradient $\nabla E(w, b)$ is a vector representing the point of steepest ascent in parameter space. If we let $w_i$ represent a parameter value, such as b or at an index in vector w, and if we assume that there are m such parameter values (in this case w is a vector of length m−1), we can write the gradient as $$\nabla E(w, b) = \left[\frac{\partial E}{\partial w_j}, \dots, \frac{\partial E}{\partial w_m}\right]$$

Gradient descent updates the parameters using the equation $$w_j = w_j + \Delta w$$

where $$w = -\alpha \frac{\partial E}{\partial w_j}$$

where $\alpha$ is the learning rate, such as 0.2. The negative sign is there because we want to go in the opposite direction of the error; we want to reduce error. The gradient vector $\nabla E(w, b)$ determines in what direction we go to update the parameters, and the learning rate determines how far we go in that direction to update the parameters.

To compute $$\frac{\partial E}{\partial w_i},$$

we use the chain rule of derivatives $$\frac{\partial E}{\partial w_j} = \frac{dE}{df}\frac{df}{dg}\frac{\partial g}{\partial w_j}$$

where $$\frac{\partial E}{\partial w_j} = \frac{d}{df}\frac{1}{2}\sum_{i=1}^{n}(y_i - f(x_i))^2 \frac{df}{dg}\frac{\partial g}{\partial w_j} = \sum_{i=1}^{n}(y_i - f(x_i))\frac{df}{dg}\frac{\partial g}{\partial w_j}$$

In an embodiment, the nonlinearity $\sigma$ is the sigmoid function $$\sigma(wx+b) = \frac{1}{1+e^{-(wx+b)}}$$

which has the derivative $$\frac{df}{dg} = \frac{d\sigma(wx+b)}{dg} = \sigma(wx+b)(1-\sigma(wx+b))$$

and $$\frac{\partial g}{\partial w_j} = x_{ij}$$

where $x_{ij}$ is the jth value of input vector i. In total, we have $$\frac{\partial E}{\partial w_j} = \sum_{i=1}^{n}(y_i - \sigma(wx+b))\sigma(wx+b)(1-\sigma(wx+b))x_{ij}$$

Multi-Layered Parametric Models.

The previous discussion disclosed how to update the weights for $f$ when $f$ has a simple form. Embodiments of backpropagation may be used in other applications, for example, if $f$ becomes more complex with multiple layers, as may be the case in embodiments of the Object Translator. Imagine $f(x)$ has the form $$f(x) = f^3(g^3(f^2(g^2(f^1(g^1(x))))))$$

where
$g^1(x) = W^1x + b^1$
$f^1(x) = \sigma(g^1(x))$
$g^2(x) = W^2f^1(x) + b^2$
$f^2(x) = \sigma(g^2(x))$
$g^3(x) = w^3 f^2(x) + b^3$
$f^3(x) = \sigma(g^3(x))$ so that $$f(x) = \sigma(w^3(\sigma(W^2(\sigma(W^1(x)+b^1))+b^2))+b^3)$$

where $W^1$ and $W^2$ are matricies, $w^3$, $b^1$, and $b^2$ are vectors, and $b^3$ is a scalar. These values make it so that functions $f^2$, $f^1$, $g^2$, and $g^1$ return vectors, and functions $f^3$ and $g^3$ return scalars. To compute $$\frac{\partial E}{\partial w_{ij}}$$

where $w_{ij}$ is a parameter in $W^1$, we have to account for all of the "paths" through which a change in $w_{ij}$ could affect E. This is what backpropagation provides us.

For the top level, l=3, we have $$\frac{\partial E}{\partial w_j} = \frac{dE}{dg^3}\frac{\partial g^3}{\partial w_j} = \frac{dE}{df}\frac{df}{dg}\frac{\partial g}{\partial w_j} = \sum_{i=1}^{n}(y_i - f^3(x_i))\sigma(g^3(x_i))(1-\sigma(g^3(x_i)))f_j^2(x_i)$$

where the subscript j indicates jth position of the output of vector-valued function $f^2$. The approach we use for a single training value x for levels l=1 and l=2 is as follows $$\frac{\partial E}{\partial w_{ij}^l} = \frac{\partial E}{\partial g_j^l}\frac{\partial g_j^l}{\partial w_{ij}}$$

$$\frac{\partial g_j^l}{\partial w_{ij}^l} = \begin{cases} f_i^{l-1} & \text{if } l > 1 \\ x_i & \text{otherwise} \end{cases}$$

$$\frac{\partial E}{\partial g_j^l} = \frac{\partial E}{\partial f_j^l}\frac{\partial f_j^l}{\partial g_j^l}$$

$$\frac{\partial f_j^l}{\partial g_j^l} = \begin{cases} \sigma(g_j^l)(1-\sigma(g_j^l)) & \text{if } l > 0 \\ \sigma(x_j)(1-\sigma(x_j)) & \text{otherwise} \end{cases}$$

$$\frac{\partial E}{\partial f_j^l} = \sum_{k \in above(l)} \frac{\partial g_k^{l+1}}{\partial f_j^l}\frac{\partial E}{\partial g_k^{l+1}} = \sum_{k \in above(l)} \partial w_{ik}^l \frac{\partial E}{\partial g_k^{l+1}}$$

In this case, $x_i$ means the ith value of input vector x, and above (l) is the set of indicies in the vector valued function in the level above l.

An Object Translator

The exemplary backpropagation algorithm described above works for an arbitrary number of levels l, and we take advantage of this fact for an embodiment of an Object Translator. An embodiment of an Object Translator is a function of the form $$y = f(x)$$

Where x is a sequence of one-hot vectors representing words, and y is also a sequence of one-hot vectors representing words. The Object Translator can be written as $$f(x) = f^d(f^e(x))$$

where $f^e: x \rightarrow h$ is the encoder that converts the input sequence into an abstract representation vector h, and $f^d: h \rightarrow y$ is the decoder that converts the abstract representation vector h into a sequence of words y.

In an embodiment, the encoder function $f^e: x \rightarrow h$ is a Recurrent Neural Network that takes the form $$f^e(x) = f_h^e(\ldots(f_h^e(f_h^e(h_0, x_0), x_1), \ldots, x_{n-1}) = h_{n-1} = h$$

Where n is the number of vectors (words) in the input sequence x, and the function $f_h^e: h_{t-1}, x \rightarrow h_t$ takes the form $$f_h^e = \sigma(W_H h_{t-1} + W_I x_t) = h_t$$

We then have $h = h_{n-1}$ as the abstract intermediate representation. The vector $h_0$ can be set to all zeros.

In an embodiment, the decoder $f^d: h \rightarrow y$ is a Recurrent Neural Network that iteratively outputs word $\hat{y}_t$ at position t until a special stop symbol is generated. It has the form $y_t = \text{argmax}(W_O^d s_t)$ where $s_t = \sigma(W_I^d y_{t-1} + W_H^d s_{t-1})$ and $s_0 = h$. The function argmax just returns the index with the highest value and converts it into a one-hot vector.

During training, the softmax function, which can be used to normalize the exponential values of $W_O^d s_t$ to create a probability distribution, allows use of an embodiment of an error function. An exemplary error function is called "cross entropy." For a training example (x, y), the cross-entropy error is the sum of negative log of the probabilities given for each word $\hat{y}_t$ in the sequence y by the softmax function at sequence position t.

In this embodiment, the parameters are the matrices $W_H^d$, $W_I^d$, $W_O^d$, $W_H$, and $W_I$, and note that the d superscripts stand for "decoder." In this case, the corresponding "b" parameters have been omitted for notational convenience.

In an alternative embodiment that may be used to encode particularly large sequences of words x, we can replace the encoder $f^e: x \rightarrow h$ with a function that takes the average of word vectors from matrix $W_I$. An exemplary function that does so is the translation-specific vector-learner $f^e: x \rightarrow h$ that takes the form of $$f^e(x) = \frac{1}{n}(W_I x_0 + W_I x_1 + \ldots + W_I x_{n-1}) = h$$

Here, the parameters of $W_I$ preferably would be learned through backpropagation, as described above.

Another alternative method of encoding an object consisting of text is to use a word2vec method for computing continuous distributed vector representations of words. An exemplary embodiment of word2vec method is disclosed in U.S. Pat. No. 9,037,464 to Mikolov, et al., entitled "Computing Numeric Representations of Words in a High Dimensional Space." An exemplary embodiment of a word2vec tool is available at https://code.google.com/p/word2vec/ and provides an implementation of continuous bag-of-words or skip-gram architectures for computing continuous distributed vector representations of words. A vector representation for a body of text can be computed by averaging the vectors. Unlike word2vec, the translation-specific vector-learner disclosed here learns vectors in the context of learning to predict the target (the description).

Another alternative method for encoding an object consisting of text is a doc2vec method that learns vectors representing the meaning of pieces of texts (ranging from sentences to documents) using a neural network to predict the words in that paragraph. An exemplary embodiment of a doc2vec tool is the Gensim implementation found at https://radimrehurek.com/gensim/.

Another alternative method of encoding uses a convolutional neural network (CNN) adapted to natural language processing. CNNs have had spectacular success in the computer vision task of image classification. CNNs have repeated feature detectors, and each detector only looks at a small part of the image, and these feature detectors all share weights. The maximum values from the feature detectors are "pooled" into a fixed-length vector or matrix, from which another level of processing can be performed or, if it is the last level of the network, classification can be performed. A useful way to think about an embodiment of a method for using a CNN for natural language processing is that it entails running a feature detector (also called a feature map) over a sequence of words and then recording the maximum value of that feature (called pooling). In fact, one typically does this for k feature detectors, so one ends up with a vector of length k. The useful aspect of taking this maximum value of a feature detector is that it doesn't matter how long the input sequence is. This process can be repeated over multiple levels. The parameters for these feature detectors may be learned using supervised learning. To use a CNN to encode data, a classification task may be used to train the feature detectors. Exemplary classification tasks include determining the topic of text and determining the sentiment of text. Once the feature detectors are trained, the classification task can be discarded and the vector of length k can be used to summarize the text. An exemplary embodiment of a CNN implementation for natural language processing is included in the code available at http://github.com/yoonkim/CNN_sentence for the paper Yoon Kim, Convolutional neural networks for sentence classification, *arXiv preprint arXiv*1408.5882, 2014.

Alternative Parameter Updates.

Other alternative embodiments include alternate methods for updating the parameters using the equation $$w_j = w_j + \Delta w$$

For example, in an alternative embodiment, the learning rate α can vary by paramter j. In one such embodiment, the update equation can be changed to $$w_j = w_j + \Delta w = w_j - \alpha_j \frac{\partial E}{\partial w_j}$$

where $$\alpha_j = \frac{\alpha}{\sqrt{\sum_{\tau=1}^{t} g_\tau^2}}$$

where $g_t$ is the value of $$\frac{\partial E}{\partial w_j}$$

at update iteration t.

Other embodiments include alternative nonlinearities, such as tanh and rectifiers. In addition, the error function can have a regularization component, such as adding a function of the magnitude of all the parameters to the error. This helps with overfitting by encouraging the parameter values to be small. Another method that helps with overfitting is dropout, where some of the outputs of vector-valued functions are arbitrarily set to 0 to encourage the network to learn to be robust. In addition, the encoder $f^e$ and decoder $f^d$ can have larger amounts of parameters and levels. For example, they may use or comprise Long Term Short Term Memory Networks (LSTMs) or Gated Recurrent Units (GRUs).

Some RNNs may have a very large computational graph because the size is proportional to the length of the input. Since parameter values are updated using multiple applications of the chain rule, the gradient can go to infinity or 0. In some cases there may be a limitation on how much information can reach deep portions of the computation graph. An alternative embodiment addresses this limitation by teaching the node that holds the state $h_1$ to forget information that is not useful and to remember information that is. The node learns to decide which information to keep using a gating mechanism.

Figure 3:
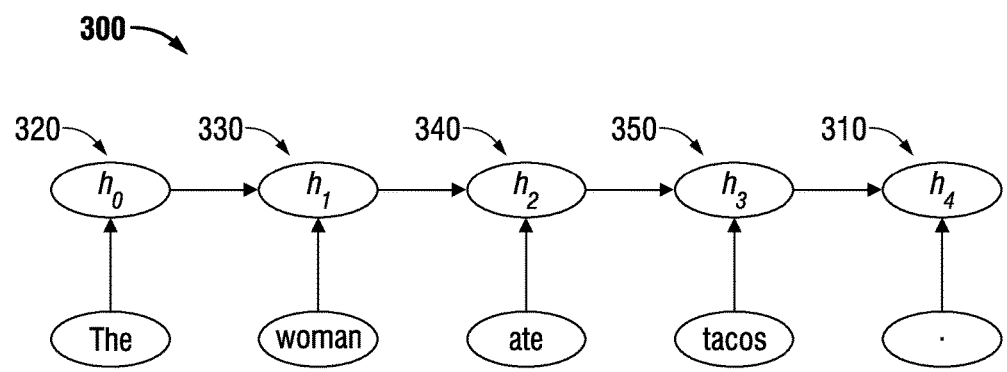
FIG. 3 illustrates an exemplary method of encoding text using an RNN.

FIG. 3 illustrates an exemplary method of using an embodiment of an RNN to encode the sentence "The woman ate tacos." Each of the words in the sentence is represented as a vector or other numeric representation in a high-dimensional space. Preferably this is done by having a matrix V of size [w×m] where w is the number of words in the vocabulary and m is the length of the vector used to represent each word. In typical embodiments, the vocabulary may include 30,000 to 100,000 words (w), and the vector length m may be between 100 to 1,000. The vector values in an embodiment are floating point numbers. Each of the hidden states $h_1$ is also, preferably, a vector or other numeric representation in a high-dimensional space. The value of each hidden state preferably is computed from a function that takes the previous hidden state (or possibly a vector of 0 for the first hidden state) and the vector of the input word. An embodiment of such a function is $$f_h^e = \alpha(W_h h_{t-1} + W_I x_t) = h_t$$

In embodiments that include this structure, the hidden state at the end of the sentence (e.g., hidden state $h_4$ (310) in FIG. 3) preferably is a vector (or other numeric representation in a high-dimensional space) that contains a representation of the entire sentence.

Figure 4:
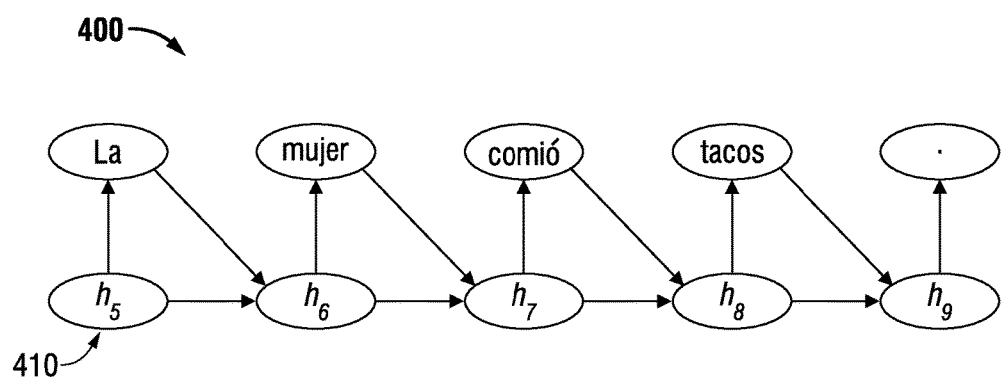
FIG. 4 illustrates an exemplary method of decoding a representation using an RNN.

FIG. 4 illustrates an embodiment of decoding a representation using an embodiment of an RNN. Each hidden state is updated using a function that takes the previous hidden state and the last predicted word. The initial context state, $h_5$ (410) is the encoded representation. Thus, for example, the encoded representation in FIG. 3 (hidden state $h_4$ (310)) could be used as the initial context state, $h_5$ (410) in FIG. 4. There is a separate nonlinear function that predicts the next word from the hidden state. In an embodiment, the non-linear predictive function is the same as, or similar to, the non-linear function employed in the encoder. The RNN continues to predict words until it predicts a stop symbol.

In an embodiment, the stop symbol is '.'; other embodiments use a special stop symbol to terminate processing. An exemplary source object for the Translator may comprise a number of sentences concatenated together, where each sentence terminated by a period (which preferably is handled as a vocabulary word), and the entire string is terminated by a stop symbol.

Sometimes it may be difficult to identify the best decoding. In an embodiment the state $h_t$ preferably depends on the prediction at time t−1. This means that if the prediction at time t−1 is wrong, the prediction at time t will likely be wrong. The way that "wrong" will look, in the absence of ground truth, is that no predicted value will have a high likelihood, and since the cost of a translation may be computed, in an embodiment, as the sum of the negative log probabilities of the words in a sequence (as a probability goes lower, the negative log probability goes higher), making a "bad" prediction could result in a bad translation. To find translations with the highest probability, one could exhaustively search the space, but this option is not practical for non-trivial spaces; useful spaces are too big for this.

An exemplary approximation to the best sequence can be found by using beam search. Beam search maintains a set of k candidate translations, and at each timestep finds the k best next words starting from the existing candidate translations. These k best words are added to the candidate from which they came, and these become the new set of k candidate translations, where k, in an embodiment, may be between 5-30, or more specifically, around 20. When a next word is a special end-of-translation word, that candidate is completed. Beam search continues until all candidate translations have ended with an end-of-translation word (or stop symbol). In an embodiment of this approach, the output translation will be the candidate translation with the lowest total cost.

In the exemplary embodiment illustrated in FIGS. 3 and 4, all of the information in the encoded sequence (or representation) preferably fits in the vector $h_4$ (410 in FIG. 4, 310, in FIG. 3). This embodiment may be used with short sequences of source objects and short sequences of target objects because the information in each of the preceding exemplary state vectors (shown in FIG. 3) $h_0$ (320), $h_1$ (330), $h_2$ (340), and $h_3$ (350) is squeezed into this vector $h_4$ (310). In an embodiment, a short sequence would include 100 to 200 tokens. The sequences of source objects and target objections do not, in an embodiment, require the same size limit.

Align and Translate is an alternative approach to learn how important each encoding state is to making the current prediction. Align and Translate is a method of "attention," which has to do with how you look at the encoding when decoding. In a simple embodiment, the encoder just encodes into a vector. In an embodiment that uses "attention," the text source object is encoded into a sequence of vectors, and the attention mechanism chooses before it decodes each word how attention is paid to each of the encoded vectors. An embodiment of such an approach is disclosed in Dzmitry Bahdanau, Kyunghyun Cho, and Yoshua Bengio, Neural machine translation by jointly learning to align and translate, *arXiv preprint arXiv*:1409.0473, 2014. This approach includes learning a function that at each decoding state assigns a weight to each encoding state based on the previous decoding state. Those weights are then used to generate a context vector, specific to each decoding state, which is used to predict the next word.

While decoding may be performed, in an embodiment, using an RNN, there are other ways an object consisting of text can be encoded.

To evaluate embodiments described herein, networks discovered from the Integrated Conflict Early Warning System (ICEWS) and from Twitter data are characterized. ICEWS can be thought of as a version of Global Database of Events, Language, and Tone (GDELT). Both GDELT and ICEWS use computers to code news articles into discrete events using CAMEO codes, but GDELT uses the TABARI extraction engine, and ICEWS uses Jabari-NLP, which is a little more accurate.

The ICEWS data consists of two years of events relating to a particular country (46,330 events in total). Each event consists of a source entity, a target entity, an event type, an event date, and a sentence from which the event was extracted. These events define a temporal graph with the event entities as nodes linked by edges if an event occurred between two entities. The Twitter data will be discussed in a section below.

Single-Run Network Discovery Over ICEWS.

Using a TAERM Network Detection Method, five networks were found in the data.

Sliding-Window Network Discovery Over ICEWS.

To detect additional networks, network detection was performed multiple times over a sliding window of time. Networks were detected every 50 days in the temporal subgraph spanned by all events that occurred in a trailing window of 120 days. The same network detection parameters were used each time. For each network detected, a corpus of sentences corresponding to each event edge in that network was built. Any network with more than 20 members was excluded from the analysis. This approach resulted in 21 networks.

Single-Run Network Discovery Over Twitter.

The evaluation focused on a particular country and collected 93,428 Tweets from that country from Jun. 12 to Jul. 1, 2013. A single run of network detection revealed 33 networks.

Training Data.

The Object Translator converts text to descriptions. For purposes of evaluating embodiments, text from Wikipedia and the Open Source Center (OSC) was used to train the Translator.

Open Source Center (OSC).

The Open Source Center is a collection of open source intelligence materials (including news articles) available to authenticated government and contractor employees at http://www.opensource.gov/. Using news articles focused on a particular country, the Translator was taught how to generate the news headlines that went with the articles. 698,705 articles from the Open Source Center, covering the period from Oct. 1, 2013 to Dec. 15, 2014, were used. To make the articles more like the eventual deployment data coming from the networks, sentences in the articles were scrambled and half of the sentences were dropped. To generate more training data, the process of randomly scrambling and dropping the sentences was applied to each article five times, and all five versions of the article were used, each with the original headline. All data was lowercased and tokenized. Particular types of headlines were filtered out, and the resulting data had 3,493,525 pairs, where each pair consisted of an article text and a headline.

Wikipedia.

Wikipedia training data can be obtained, in an embodiment, from DBpedia http://downloads.dbpedia.org/3.9/en/long_abstracts_en.nq.bz2. A total of 4,004,480 article abstracts were downloaded. Each abstract came in both a short and long version. The long version was used to predict the short version.

Generating Network Descriptions.

For each discovered network, a network "news article" was generated from the lines of the news articles associated with the nodes in the network. From that network "news article," a "headline" was generated, which became as the description.

Experiment 1: Qualitatively Evaluate Coupled Descriptions

Experiment 1 uses an embodiment of Align and Translate. OSC data was used for training. The discovered networks from the single-run network discovery over ICEWS were used. For each discovered network, the lines of the news articles associated with the nodes in the network were used to generate a network "news article." From that network news article, a "headline" was generated, which became as the description.

Table 1 displays the manual network descriptions and the corresponding descriptions generated by the Object Translator. Words indicating particular locations are replaced with 'X.' Particular people or groups are replaced by 'Y.'

TABLE 1

Manual and Generated Descriptions for Networks

| Network | Manual Description | Generated Description |
| --- | --- | --- |
| Network 0 | territorial conflict over fishing in X sea | X: X violated sea code with typhoon |
| Network 1 | X peacekeepers in conflict with Y | X: un peacekeepers abducted in X |
| Network 2 | X meeting and X meeting | Y is a meeting in the prime minister |
| Network 3 | Rebels and street crime in X | X: victims in Y attack in X |
| Network 4 | Misc. at country level | X: call for help on social government |

The Network 0 description was reasonably good. There was a typhoon discussed in the network article. The Network 1 description was very good. It was even better than the manual description. The articles really were about an abduction. The Network 2 description was pretty good considering that Network 2 was not a cohesive network. Its "article" was only made of two sentences (the other edges were similarity edges added if nodes were sufficiently similar). The Network 3 description was great because it again was more specific than the manual description. The Network 4 description reflects that Network 4 was a general network about things at the country level.

Experiment 2: Quantitative Evaluation of ICEWS Networks

In experiment 2, multiple implementations of the Object Translator are evaluated. For the Object Translator, training involves two parts. The first part is encoding source objects into the intermediate representation. The second part is decoding intermediate representations into target objects. In the coupled implementation embodiment, both the encoder and the decoder are trained simultaneously. In the decoupled implementation embodiment, the encoder is trained separately from the decoder. Decoupled training may be used in embodiments that use word2ve, doc2vec, and CNN encoding methods because, typical word2vec, doc2vec, and CNN tools encode without decoding, word2vec and doc2vec tools are unsupervised, and CNNs need an external supervised task. Decoding preferably uses a recurrent neural network (RNN). The coupled implementation preferably uses an RNN for encoding as well. Embodiments of the decoupled implementation can encode the source object using Word2Vec, Doc2Vec, or CNNs.

The evaluation also compares against extractive summarization, specifically, the Steinberger-Jezek Variation of Latent Semantic Analysis.

For each network a description was generated using the following methods:
1. coup_osc. Coupled translator trained on OSC data.
2. coup_wiki. Coupled translator trained on Wikipedia data.
3. dec_par_osc. Decoupled translator with the encoding using Doc2Vec trained on OSC data.
4. dec_par_wiki. Decoupled translator with the encoding using Doc2Vec trained on Wikipedia data.
5. dec_vec_osc. Decoupled translator with the encoding using Word2Vec trained on OSC data.
6. dec_vec_wiki. Decoupled translator with the encoding using Word2Vec trained on Wikipedia data.
7. dec_cnn_wiki. Decoupled translator with the encoding using a CNN on Wikipedia data.
8. sent_sel. Sentence selection, compared with an extractive method that uses LSA to pick the best sentence.

Here are some specifics on how the training was done in this embodiment. 1. The decoupled methods were not shuffled and the coupled methods were. 2. The decoupled methods had max length of 100 tokens on source and target for training. 3. The coupled method had a maximum length of 50 on the source for training. 4. For all methods, the limit on source tokens was 100 for testing. 5. Training was performed until convergence. Decoupled were trained for 13,000 iterations, and for coup_wiki this took about 32,000 iterations, and for coup_osc this took about 82,000 iterations. Training for the coupled methods took about a day on an Amazon g2.2xlarge GPU machine, and training for the decoupled methods took a few days on a multi-core CPU machine. 6. Translations were required to be at least 5 words long.

After they were generated, the descriptions were given to a person to rate. The rater did not know which description came from which method. The rater read the segments of text associated with each network and judged the quality of the associated generated description on a scale from 1 to 5, with 5 being the best.

Figure 5:
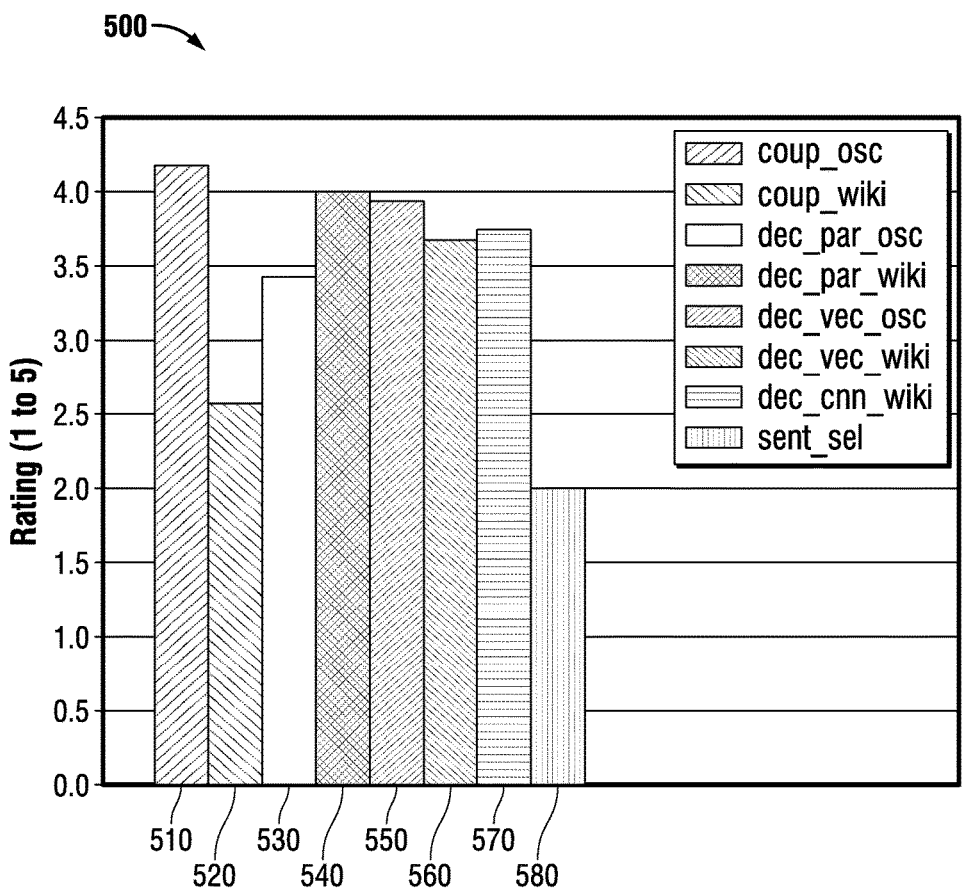
FIG. 5 is a chart summarizing results of an experiment comparing exemplary methods of characterizing entities.

FIG. 5 shows that the coupled method trained on the OSC data did the best and the extractive method did the worst. Since the short abstracts of the Wikipedia data were the same as the long abstracts, just with fewer sentences, those methods using the Wikipedia data act like an autoencoder, so that may explain why it did so poorly in the coupled case.

Also, the methods trained on OSC data have an advantage because the data is a version of what was used to generate the ICEWS networks.

Experiment 3: Qualitative Results on Twitter Data

Experiment 3 looked at the Twitter data. Since such a large number of networks were found, the generated descriptions can be used by an analyst to quickly determine which networks one might want to look at more closely. FIG. 5 shows the descriptions generated by the coupled method trained with OSC data, the coupled method trained with Wikipedia data, and the sentence selection method. Manually, looking at the tweets in each network, it was determined that 22, 25, and 28 were networks of interest and those same networks had descriptions of interest.

Querying Networks.

Embodiments of the disclosure can be used to query networks. An embodiment uses the already-trained model, so there is no additional training needed. To find a network that matches a specific query, each network is evaluated to determine the cost to generate that query as a description for the network. The lower the translation cost from network to query, the better the network matches the query.

Experiment 1: Single-Run Network Discovery Over ICEWS

Experiment 1 on querying networks uses the coupled method trained on OSC data. The following 10 queries were created and it was manually determined which network was the best response to each query. Again, places have been replaced by 'X' and terms indicating people or groups by 'Y.'
1. X peacekeepers in conflict with X rebels
2. territorial conflict in X with fishing
3. Y
4. network about street crime in X
5. network about Y rebels attacking civilians in X
6. stuff at the country level; X X, development bank
7. X conflict territorial waters
8. abduction of un peacekeepers in X
9. X wants to join Schengen
10. lots of protest by crime victims in X When the networks were ranked for each query using the translation cost, the correct network always fell within the top 2 results when the scores were rounded to nearest whole number (in one case, there was a very close tie for second where the correct network was just slightly below the second-place network). The correct network was the top result 80% of the time (similar to the results of using the "I'm feeling lucky" feature on Google).

It is worth noting that the algorithm works regardless of the variety and information nature of the queries. Some of the queries were short and some were long, and they use verbal shorthand, such as "network about" and "stuff."

Experiment 2: Single-Run Network Discovery Over Twitter

For Experiment 2 on querying networks, a rater wrote a set of queries and manually looked at the networks to determine which network should be returned for each query. A second set of queries was written for comparison.

Figure 6:
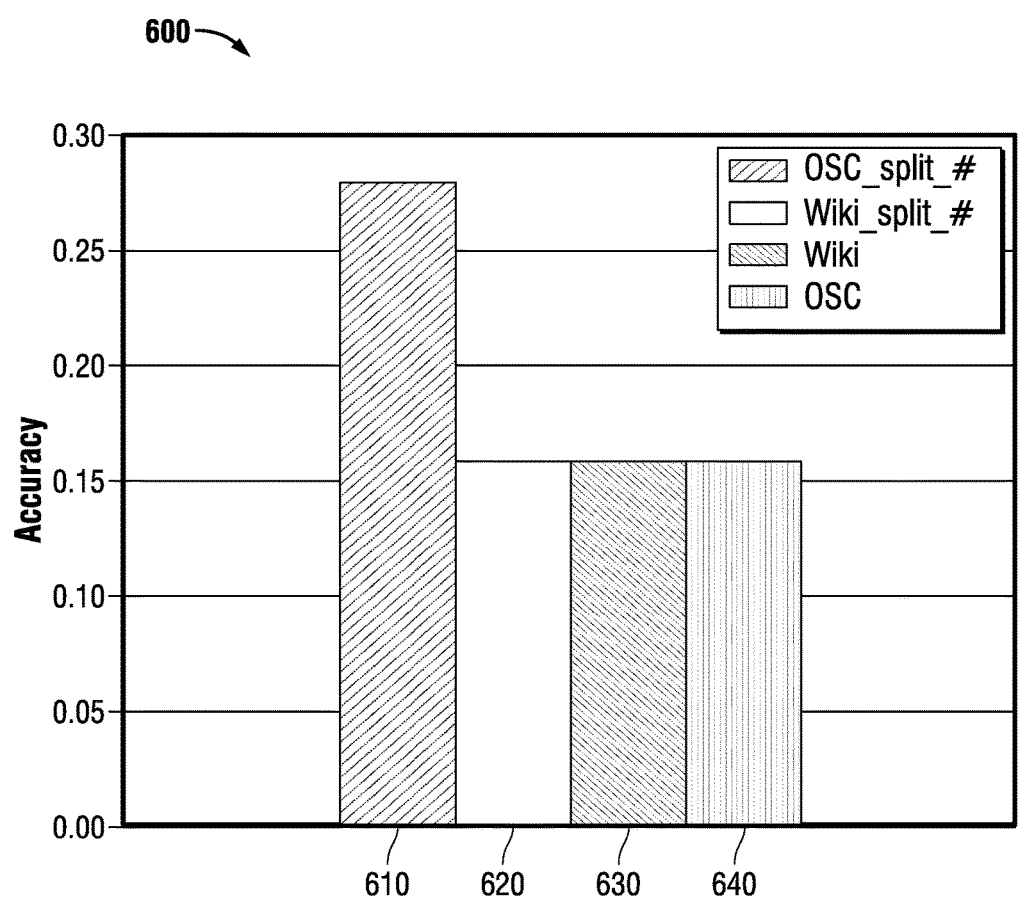
FIG. 6 is a chart summarizing results of an experiment comparing exemplary methods of querying networks.

The queries from the rater:
1. X Y cooking
2. Festivals in X
3. I hate X
4. From X
5. Q's and A's
6. Birthday X
7. BoycottX
8. Bomb attacks
9. YY
10. morons and stupid facebook
11. XYbro
12. YY
13. well said bro AND NOT X The second set of queries generated for comparison:
1. i found a picture of X
2. people shot
3. talk about movies
4. getting ready for Y
5. X mean to Y
6. complaining about facebook The queries were run through the deep learning algorithm to determine the percentage of the time the correct network was returned within the top 3 results. FIG. 6 shows the results. An embodiment of a coupled method trained on the OSC data and the Wikipedia data was used. The experiment also included running a condition for each in which hashtags were split (split_#), meaning that a hashtag such as #ILove-Running would be made into the three words "i love running." An embodiment of the Python inflection library (https://media.readthedocs.org/pdf/infection/latest/infection.pdf) was used to split the hashtags, and in an embodiment all words were treated as lowercase. The source sequence length was limited to the first 300 tokens. The results on the Twitter data may be explained in part by the sparsity of English text in the data.

One particularly interesting aspect of the Object Translator is the abstractions that it learns. Consider its output on the following training example of a news article headline.

Target: irish president to make historic state visit to Britain

Output: irish president to visit uk

Its interpretation of the target sentence is to generalize in that it shows that it has learned that "Britain" is the same thing as the "UK." Consider another example.

Target: iran foreign minister departs tehran for rome, geneva

Output: iranian foreign minister leaves tehran for rome, Geneva

In this example, it substitutes "leaves" for "departs." For the queries on the Twitter data, if you put in "talk about movies" you get network 25, which is one that does talk about movies, even though the word "movie" is never used.

Embodiments of the abstractive summarization methods described herein can be considered to be a supervised learning methods.

Implementation Details.

An embodiment of the coupled method may be based on Groundhog, which is implemented in Theano and is available at https://github.com/lisa-groundhog/GroundHog. Groundhog is a Python framework implemented in Theano that implements complex RNN models.

Theano is a symbolic programming platform for Python. Symbolic programming allows one to represent expressions in symbolic form. In generalized symbolic programming libraries such as SymPy, expressions can be automatically reduced and derivatives can be computed automatically. Theano is more restricted than SymPy, but it does compute gradients automatically.

Other advantages of Theano include the following. It automatically compiles to machine code for the GPU or CPU, depending on which is available. GPUs were built for graphics processing, but images and deep learning both require manipulation of matrices. For example, camera rotations and zooms are done through matrix transformations.

An exemplary method of using Theano comprises the following: (1) Define a computation graph by linking symbolic variables. This graph should begin with the inputs. (2) Specify a cost/error function that ties to the output of the last node of the computation graph. (3) Collect all of the parameters of the model together and compute the gradient of the cost function with respect to the parameters using theano.tensor.grad. (4) Compile a training function using a Theano function that uses changes in gradients to update the model parameters. (5) Iteratively call the training function with the data until convergence.

Figure 7:
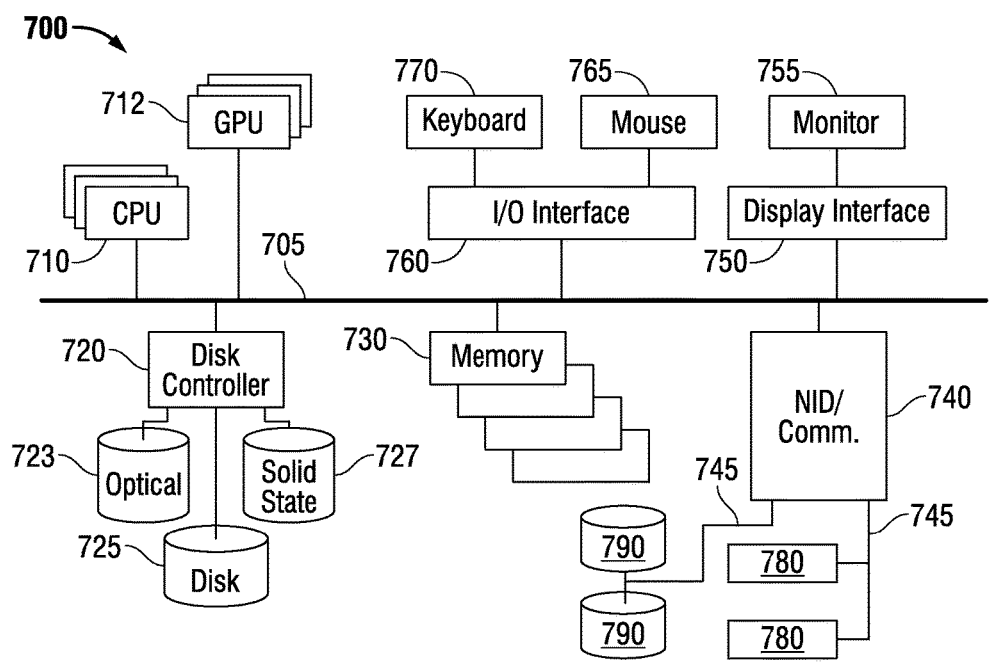
FIG. 7 is a block diagram of an exemplary computer system.

Embodiments of an Object Translator are implemented with or on a computer system. FIG. 7 is a block diagram illustrating exemplary components of a computer system 700 that includes one or more processors, including one or more central processing units (710) and/or one or more graphics processing units (GPU) (712) operatively coupled to one or more memory units 730. The processors may include or be operatively coupled to one or more special-purpose processors, for example, floating-point arithmetic co-processors. Embodiments may use a GPGPU pipeline or otherwise use GPUs for executing the instructions and performing the computer-implemented methods described herein. The one or more processors may be coupled to one or more data stores (or secondary storage devices) 723, 727, 725. Embodiments may also comprise one or more CPU or GPU instances implemented on a remote or local hardware virtual machine hosted on a local or remote computer system and operatively coupled to data storage media that is local and/or remote.

The data storage media provide sufficient capacity to store data and program instructions to implement the methods and systems described herein. The memory units 730 may include any form of memory, including RAM, flash memory, USB drives, ROM, or similar types of memory. Exemplary data stores or secondary storage devices include disk controller 720, solid-state drive 727, hard disk drive 725, optical drive, CD-ROM or DVD 723, or other types of non-volatile data storage (not depicted). A data store may also include "cloud" storage 790 or other remote computers or servers (780, 790) operatively coupled to computer system 700. Different kinds of memory units may be used together. For example, a matrix data structure may be partially stored in RAM and partially stored on a hard disk or solid-state disk during processing. Data storage media refers generally to any operatively-coupled combination of one or more memory units and zero, one, or more data stores. In an embodiment, all data storage media are non-transitory.

One or more processors 710 may be operatively coupled to one or more memory units 730 and other components of the computer system by a system bus 705. The computer system may include or be coupled to a network interface device/communications port 740 to connect to one or more networks, for example, internet or communications network connections 745 to remote storage 790 (including but not limited to "cloud" storage) or remote computer systems 780. One or more processors 710 may be coupled to one or more processors or memory units 730 over a network connection, including a local area network, a wide area network, the Internet, the World Wide Web, Wi-Fi data network, Bluetooth or other radio connection, a wireless data network, a cellular data network, or any other form of network connection that can link one or more computers or computer systems. Thus, any "coupling" of computer system components described herein may comprise close or local coupling, e.g., via a system bus, wired coupling (e.g., USB connection, Ethernet), wireless coupling (Wi-Fi connection or Bluetooth), and/or remote coupling, e.g., via a network or Web connection.

The computer system may include or be operatively coupled to one or more input devices, display devices, output devices, or other I/O devices.

An input device may include any device or combination of hardware and software adapted for entering information into a computer system, and exemplary input devices include input/output interface 760, keyboard 770, mouse 765, and other exemplary input devices not shown in FIG. 7, including touch-screen, touch-pad, key-pad, capacitive screen, trackpad or cursor-control device, telephone, smart phone, or tablet computer. An input device may be a combination of hardware and software such as a Web browser. The input device may be used to enter information into GUIs during performance of the methods described herein.

An exemplary display device may include any type of device for presenting visual information such as, for example, a computer display monitor 755, flat-screen display, or mobile device screen, and display interface 750. A display device may be a combination of hardware and software, such as, for example, a Web browser. The display device may display information in a GUI during performance of the methods described herein.

Other exemplary output devices may include any type of device for presenting, storing, or fixing in a tangible medium, such as a printer, and other types of output devices include speakers or any device for providing information in audio form. Another form of output device is a driver, for example a hardware or software driver, that organizes graphic data in a specified format for storage in memory or on a data store. Data may also be input into or output from the computer system via data coupling (e.g, over an ethernet or internet protocol network) with another computer or computer network.

The computer system or computer systems may execute one or more software applications and/or system software to implement, execute and perform the steps, methods, algorithms, and functions described herein. In an embodiment the runtime environment can interpret, compile, and/or execute Python and Theano source code. The software applications may include stand-alone applications. The software applications and/or system software include program instructions (or processor-executable instructions) which when stored in memory can be executed by one or more processors to perform the steps, methods, and functions and implement the methods, systems and apparatus described and illustrated herein.

Those of skill will recognize that the techniques of the embodiments described herein may be implemented to advantage in a variety of sequential orders and that the present invention may be generally implemented in memory or other storage media, preferably non-transitory storage media, for introduction into and/or use by a computer system adapted for performing the steps, functions, and methods described and illustrated herein.

The computer system may include one or more server computers, desktop or personal computers, laptop computers, notebook computers, palm top computers, network computers, smart phone, tablet, or other mobile device, or any processor-controlled device capable of performing the steps, methods, and functions described herein. The computer system may include computers or processors operating in parallel, including architectures in which some of the parallel computers or processors are remote and/or virtual. The computer system may be implemented on one or more servers that perform the software functions in a hosted Software As A Service (SAAS) environment. Embodiments of an Object Translator computer system can be implemented on an Amazon g2.2xlarge GPU machine, an Amazon c4.8xlarge, or a multi-core CPU machine. The computer system may be implemented using other computer architectures (for example, a client/server type architecture, a mainframe system with terminals, an ASP model, a peer to peer model, and the like) and other networks (for example, a local area network, the internet, a telephone network, a wireless network, a mobile phone network, and the like), and those other implementations are within the scope of the invention since the invention is not limited to any particular computer architecture or network.

Figure 8:
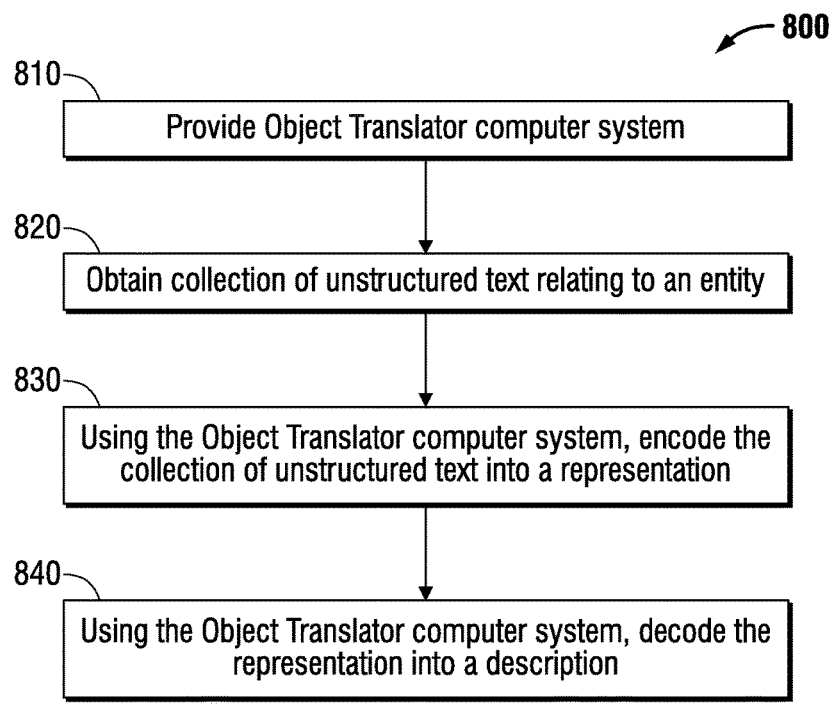
FIG. 8 is a flowchart of an embodiment of a method of characterizing an entity.

FIG. 8 is a flowchart of an embodiment of a method 800 of characterizing an entity. In an embodiment, an entity preferably is a network of individuals interacting over time. In another embodiment, an entity includes a network of individuals interacting over time.

An Object Translator computer system is provided in step 810, which includes provisioning or loading a computer system with Object Translator computer instructions or launching Object Translator computer instructions on a computer system. An exemplary Object Translator computer system comprises one or more processors coupled to data storage media.

The data storage media comprises trained parameter data comprising data generated by a training method. In an embodiment, trained parameter data comprises parameter values stored in matrices for an RNN model and learned by backpropagation during training. The training parameter data, in an embodiment, may comprise supervised training parameter data, including data generated by a supervised training method, as described herein. The training may be performed on or with the Object Translator computer system or on a different computer system.

The training methodology preferably includes training the Object Translator computer system on multiple training texts. Each training source text can be considered as a sequentially-ordered collection of a finite number of sentences. In an embodiment, the multiple training texts may include multiple different versions of the same training source text created by creating versions of the training source text with different subsets of sentences and different sequential orderings of sentences. In one exemplary approach (as described above) five different versions of a training article are created by randomly scrambling sentences and dropping half the sentences in each of the five versions and using all five versions as training texts. It is believed that this method of training improves on other approaches to abstractive summarization by enhancing the ability of the Object Translator computer system to produce accurate summaries of unstructured text such as that generated by networks of individuals interacting over time.

The data storage media further comprises Object Translator computer instructions which, when executed by the one or more processors, cause the Object Translator computer system to perform a recurrent neural network method using the trained parameter data to generate or produce descriptions (or summaries) from unstructured text. In an embodiment, descriptions may be produced from interaction data comprising unstructured text. Interaction data preferably includes interaction data generated by a network of individuals interacting over time, including in an embodiment a corpus of utterances produced at two or more different times by two or more different individuals.

The Object Translator computer instructions comprise encoder computer instructions and decoder computer instructions. Encoder computer instructions, in embodiments, comprise instructions that, when executed by the one or more processors, cause the Object Translator computer system to encode unstructured text (or, in an embodiment, interaction data comprising unstructured text) generated by the entity into an intermediate representation of the unstructured text related to the entity and to store the intermediate representation in memory or other data storage media. Exemplary encoder computer instructions comprise instructions that, when executed by the one or more processors, implement at least one of a recurrent neural network, a translation-specific vector-learner, word2vec tool, a doc2vec tool, or a convolutional neural network.

Decoder computer instructions, in an embodiment, comprise instructions that, when executed by the one or more processors, cause the Object Translator computer system to decode an intermediate representation of unstructured text or interaction data into a summary. Exemplary decoder computer instructions comprise instructions that, when executed by the one or more processors, implement a recurrent neural network.

In step 820, a collection of unstructured text related to or generated by an entity is obtained. Preferably the interaction data is obtained by the operator, SAAS hosting entity, or provider of the Object Translator computer system. Other interaction data relating to the entity may also be obtained. In an embodiment the unstructured text or other interaction data may be obtained by receiving, inputting, or ingesting one or more data sets, including previously-stored data sets and/or data sets from third parties; and in another embodiment the unstructured text or other interaction data may obtained by collecting it directly or indirectly from the entity or network of individuals. The structured text or other interaction data preferably is stored in data storage media.

Step 830 comprises encoding, with the Object Translator computer system, the collection of unstructured text into an intermediate representation of the unstructured text. The intermediate representation preferably corresponds to the collection of unstructured text and to the entity that generated the unstructured text. The intermediate representation may be or comprise a numeric representation in a high-dimensional space, and in an embodiment, may be or comprise a vector that comprises hidden state data, and may encode the entire collection or corpus of unstructured text. In an embodiment the computer system encodes interaction data comprising unstructured text into an intermediate representation. Exemplary encoding methods include at least one of word2vec, doc2vec, convolutional neural network, and recurrent neural network methods.

Step 840 comprises decoding, with the Object Translator computer system, the representation of the unstructured text into a description or summary. The description or summary may be a headline or a short description, which in an embodiment is less than 200 words. An exemplary decoding method comprises a recurrent neural network.

The exemplary method 800 preferably is performed for multiple entities. Such an embodiment comprises identifying a plurality of entities, collecting unstructured text related to each of the plurality of entities; and generating, with the Object Translator computer system, a description corresponding to each of the plurality of entities from the collection of unstructured text related to each entity.

Figure 9:
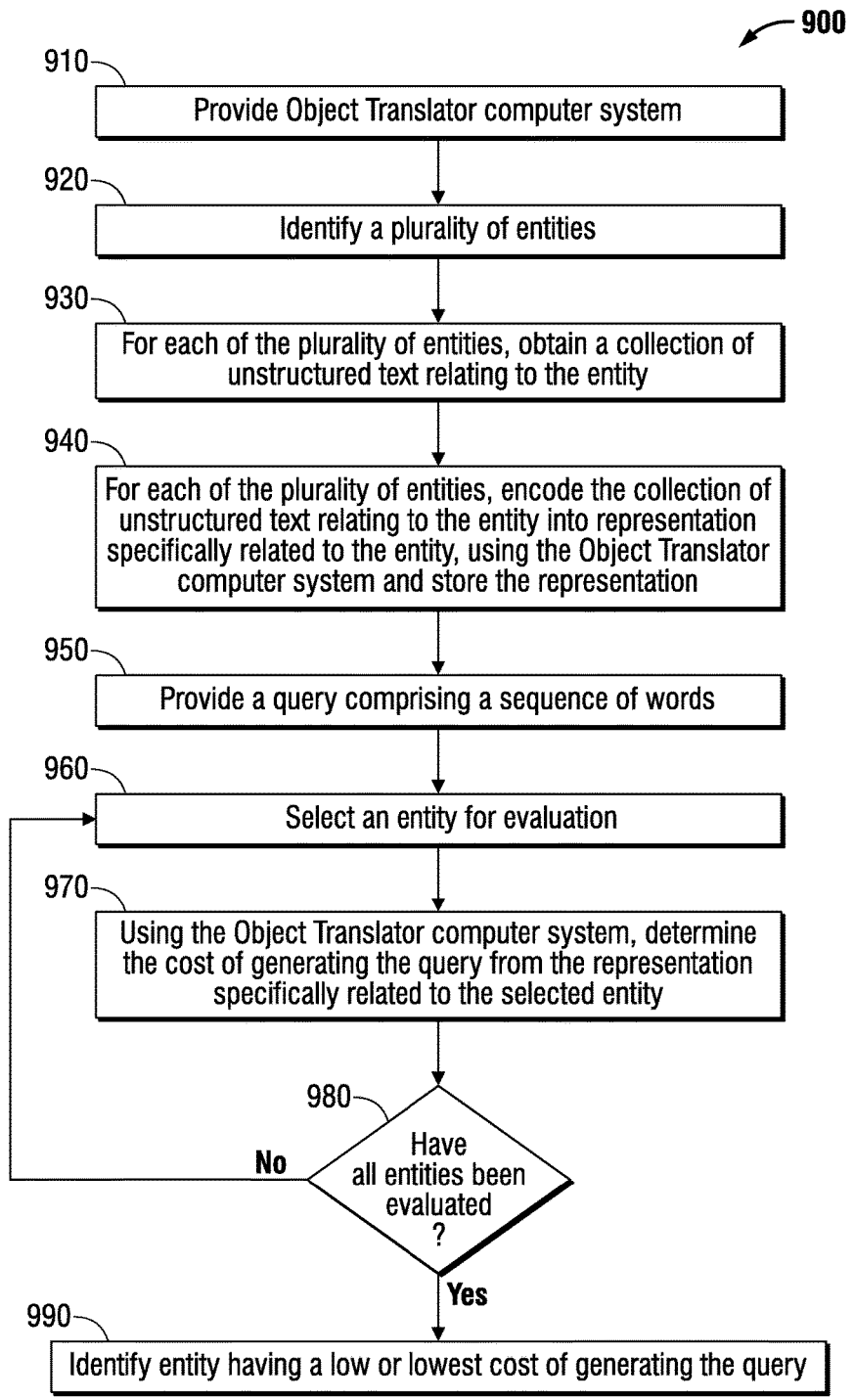
FIG. 9 is a flowchart of an embodiment of a method of querying a plurality of entities.

FIG. 9 is a flowchart of an embodiment of a method 900 of using a query to select from among a plurality of entities. Preferably, the method identifies which network matches the query. Preferably an entity is, or includes, a network of individuals interacting over time.

An Object Translator computer system is provided in step 910.

Step 920 comprises identifying a plurality of entities.

Step 930 comprises, for each of the plurality of entities, obtaining a collection of unstructured text specifically related to the entity and encoding, with the Object Translator computer system, the collection of unstructured text specifically related to that entity into an intermediate representation of the unstructured text. Each of the intermediate representations is stored in data storage media.

Step 940 comprises providing a query comprising a sequence of words.

Steps 950-960 are performed for each of the plurality of entities. Step 950 comprises determining, for each of the plurality of entities, the cost of generating the query using the Object Translator computer system from the intermediate representation specifically related to the entity.

An embodiment of a method for determining the cost of generating the query using the Object Translator computer system includes the following steps. For the selected entity, use the intermediate representation specifically related to that entity as the initial context vector for a recurrent neural network. Begin with the first word of the query. Determine the cost of generating the first word from the initial context vector. An exemplary method of determining the cost is cross entropy error over a softmax function. Selecting the first word determines a hidden state by combining the vector representation of the first word and the initial context vector. Store the cost of generating the first word. Compute the cost of generating the second word of the query starting from the hidden state. Update the hidden state using the vector from the second word and the current hidden state. Add the cost of generating the second word to the cost of generating the first word. Continue this process until every word in the query has been generated in sequence. The query-generating-cost for an entity is the cumulative cost total of generating each word in the query in succession from the representation specifically related to the selected entity.

Step 960 comprises selecting an entity based on a low cost of generating the query. The entity that is selected may be the entity with the lowest query-generating-cost, or, in another embodiment, the selected entity may be any entity with a query-generating cost below a predetermined threshold. The entity selected is the entity that matches the query.

The terms and descriptions used herein are set forth by way of illustration only and are not meant as limitations. Those skilled in the art will recognize that many variations are possible with the spirit and scope of the invention as defined in the following claims, and their equivalents. The described embodiments illustrate the scope of the claims but do not restrict the scope of the claims.

We claim:

1. A method of investigating networks of individuals interacting over time, comprising:
   providing an object translator computer system comprising:
   one or more processors coupled to non-transitory data storage media,
   wherein the data storage media comprises trained parameter data, and
   wherein the data storage media further comprises object translator computer instructions which, when executed by the one or more processors, cause the object translator computer system to perform a recurrent neural network method using the trained parameter data to create summaries of interaction data comprising unstructured text generated by a network of individuals interacting over time, the object translator computer instructions further comprising:
   encoder computer instructions to encode interaction data into an intermediate representation of the interaction data, said intermediate representation comprising a numeric representation in a high-dimensional space, and to store the intermediate representation in the data storage media, and
   decoder computer instructions to decode the intermediate representation of interaction data into a summary;
   encoding first interaction data into a first intermediate representation of said interaction data, wherein the first interaction data comprises a corpus of utterances produced at a plurality of different times by a plurality of different individuals, and wherein the encoding is performed by the object translator computer system;
   decoding, with the object translator computer system, the first intermediate representation of the interaction data into a first summary corresponding to the first network of individuals interacting over time;
   encoding a second intermediate representation of second interaction data generated by a second network of individuals interacting over time, and decoding the second intermediate representation into a second summary corresponding to the second network of individuals interacting overtime and
   identifying which of the plurality of networks of individuals interacting over time matches a query, further comprising
   providing a query comprising a sequence of words;
   for each of the plurality of networks of individuals interacting over time, determining the cost of generating the query from the intermediate representation corresponding to the network, wherein determining the cost is performed by the object translator computer system; and
   selecting the network having the lowest cost of generating the query.

2. The method of claim 1 wherein the encoder computer instructions further comprise instructions to implement at least one of a translation-specific vector-learner, a recurrent neural network, a word2vec tool, a doc2vec tool, or a convolutional neural network.

3. The method of claim 1 wherein the decoder computer instructions further comprise instructions to implement a recurrent neural network.

4. The method of claim 1 wherein the encoder computer instructions further comprise instructions to encode unstructured text into an intermediate representation of the interaction data.

5. The method of claim 4 wherein the interaction data encoded into an intermediate representation is limited to unstructured text.

6. The method of claim 1 wherein the trained parameter data comprises supervised training parameter data.

7. The method of claim 1 wherein the trained parameter data comprises parameter data generated by training the object translator computer system on a plurality of training texts, the plurality of training texts further comprising a plurality of different versions of a first training source text and a plurality of different versions of a second training source text.

8. The method of claim 7 wherein each of the plurality of different versions of the first source training text comprises a different ordering of a different subset of sentences from the first source training text.

9. The method of claim 1 wherein the first summary comprises a combination of words that is not in the first interaction data.

10. The method of claim 1 wherein determining the cost of generating the query comprises determining, for each word in the query, the cost of generating that word when the intermediate representation provides the starting state.

11. A computer system for use in investigating networks of individuals interacting over time, comprising:
 one or more processors;
 non-transitory data storage media coupled to the one or more processors, wherein the data storage media comprises trained parameter data, and
 wherein the data storage media further comprises interaction data comprising unstructured text generated by a plurality of networks of individuals interacting over time, the interaction data for each of the plurality of networks comprising a corpus of utterances produced at a plurality of different times by a plurality of different individuals, and
 wherein the data storage media further comprises processor-executable computer instructions which, when executed by the one or more processors, cause the computer system to perform a recurrent neural network method using the trained parameter data to create summaries of the interaction data generated by each network of individuals interacting over time, the instructions further comprising:
  encoder instructions to encode interaction data into an intermediate representation of the interaction data, said intermediate representation comprising a numeric representation in a high-dimensional space, and to store the intermediate representation in the data storage media, and
  decoder instructions to decode the intermediate representation of interaction data into a summary
  instructions to identify which of the plurality of networks of individuals interacting over time matches a query comprising a sequence of words; and
  instructions to determine, for each of the plurality of networks of individuals interacting over time, the cost of generating the query from the intermediate representation corresponding to the network, and to select the network having the lowest cost of generating the query.

12. The computer system of claim 11 wherein the encoder instructions further comprise instructions to encode unstructured text into an intermediate representation of the interaction data.

13. The computer system of claim 1 wherein the instructions further comprise instructions to train the computer system on a plurality of training texts, the plurality of training texts further comprising a plurality of different versions of a first training source text and a plurality of different versions of a second training source text.

14. The computer system of claim 13 wherein each of the plurality of different versions of the first source training text comprises a different ordering of a different subset of sentences from the first source training text.

15. The computer system of claim 1 wherein the instructions to determine the cost of generating the query from an intermediate representation further comprise instructions to determine, for each word in the query, the cost of generating that word when the intermediate representation provides the starting state.

* * * * *